Oct. 8, 1935.　　C. A. BASORE ET AL　　2,016,585
FLUXING AND BONDING COMPOSITION FOR USE IN WELDING OR BRAZING
Filed Dec. 9, 1933　　2 Sheets-Sheet 1
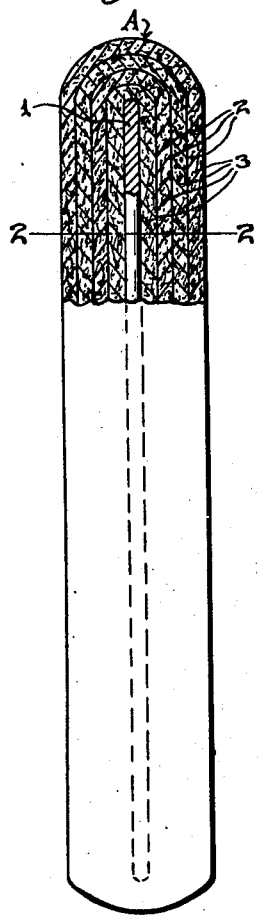
Fig. 1.
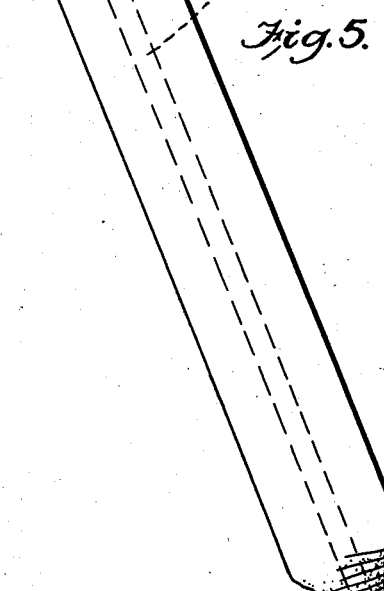
Fig. 5.
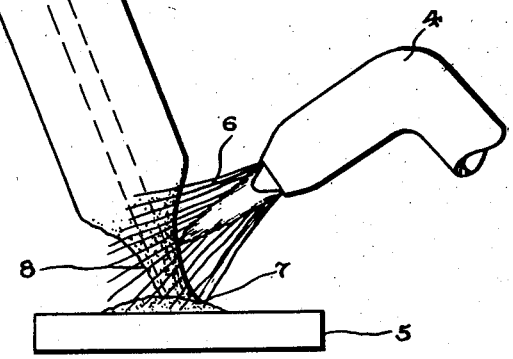
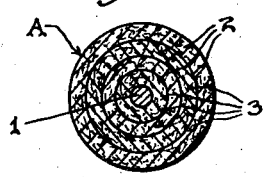
Fig. 2.
Inventors
Cleburne A. Basore
Daniel T. Jones,
By James M. Earnest
Attorney Oct. 8, 1935. C. A. BASORE ET AL 2,016,585
FLUXING AND BONDING COMPOSITION FOR USE IN WELDING OR BRAZING
Filed Dec. 9, 1933 2 Sheets-Sheet 2
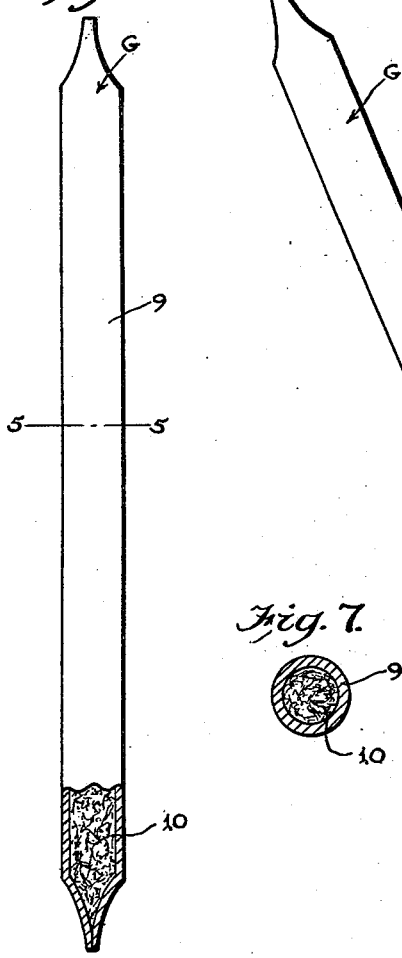
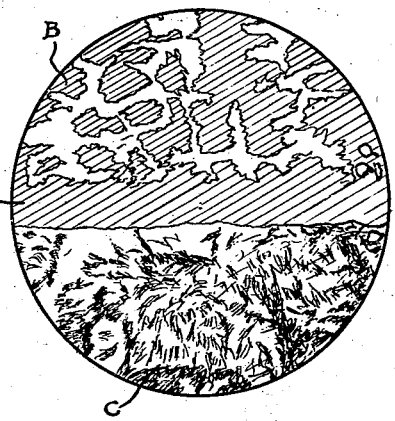
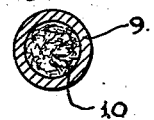
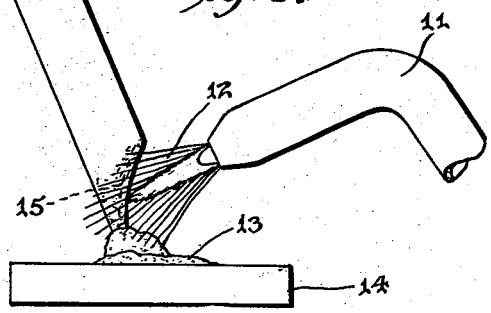
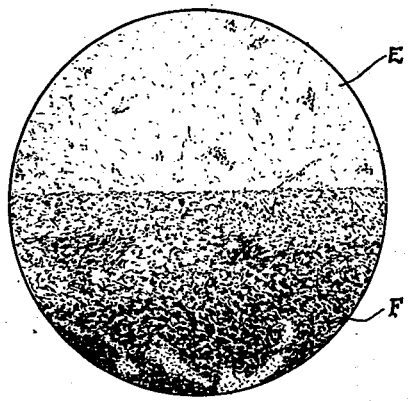
Inventors
Cleburne A. Basore
Daniel T. Jones,
By James M. Earnest
Attorney Patented Oct. 8, 1935

2,016,585

UNITED STATES PATENT OFFICE 2,016,585

FLUXING AND BONDING COMPOSITION FOR USE IN WELDING OR BRAZING

Cleburne A. Basore and Daniel T. Jones, Auburn, Ala., assignors, by direct and mesne assignments, to The Chemical Research and Development Company, Birmingham, Ala., a corporation of Delaware Application December 9, 1933, Serial No. 701,715

18 Claims. (Cl. 219—8)

The invention relates to welding or similar operations wherein a ferrous metal in fluid form is deposited on a solid base metal.

One object of the invention is to provide a fluxing and bonding composition which may be applied to a metallic or fibre rod, or which may be used in a metallic or fibre tube, in a welding or brazing operation or the like, to effect a bond between the base metal on which the deposit is made and the deposited ferrous metal, without fusion or melting of the base metal.

Another object of the invention resides in the provision of a fluxing and bonding composition for use in a welding operation or the like, which will destroy or remove rust, grease, paint or other foreign matter from the base metal during application of the weld deposit, thereby rendering the use of mechanical means, such as polishing or grinding, for removal of such foreign matters, unnecessary.

A further object of the invention is to provide a rod adapted for use in either a welding or brazing operation or the like, to which great fluidity can be imparted when desired, during application of the deposit and hence may be deposited in a very thin skin or layer.

A further object of the invention is to provide a rod which may be in the form of a composite rod or in the form of a tubular container, adapted for use in either a welding or brazing operation or the like, of such composition that an alloy steel of great hardness and toughness may be deposited therefrom on any suitable base by fusion of the rod or tube.

Further objects of the invention will appear from the following description when taken in conjunction with the accompanying drawings, wherein:

Figure 1 is an elevation, partly in section, of a welding rod embodying one form of the invention.

Fig. 2 is a horizontal section taken on line 2—2 of Fig. 1.

Fig. 3 represents a micro-photograph showing a section of a specimen in which a weld deposit has been made on a base metal of high carbon steel.

Fig. 4 represents a micro-photograph showing a section of a specimen in which a weld deposit has been made on a base metal of low carbon steel.

Fig. 5 is a view in perspective showing a welding rod as it is being fused to form a deposit on a base metal.

Fig. 6 is an elevation partly in section, showing the rod in the form of a tubular container.

Fig. 7 is a horizontal section taken on line 5—5 of Fig. 6.

Fig. 8 is a view in perspective showing the rod in the form of a tubular container as it is being fused to form a deposit on a base metal.

According to one aspect of the invention, there is provided a fluxing and bonding composition which, for example, may be employed in the form of a composite rod, or which may be employed in conjunction with a suitable tubular container, for use in either a welding or brazing operation or the like, which results in the formation of an alloy steel and in the formation of boron carbide during the welding or like operation.

In the practice of this embodiment of the invention we employ a fluxing and bonding composition having as essential ingredients one or more heavy metals such as iron, manganese or chromium, together with carbon and borax. The heavy metals not only act chemically leading to the formation of an alloy steel, but also serve as a vehicle in which the carbon and borax are suspended, the resultant mixture being completely enveloped or coated by a suitable hydrophobic colloid such as a sodium silicate solution so as to better maintain the heavy metals, carbon, and borax in contact with each other, and also to seal or protect the carbon and borax against atmospheric conditions so that the carbon will not burn up as it would do ordinarily, and the borax cannot escape, when the flame of the oxy-acetylene torch is applied. The ingredients of the vehicle may be varied but in any event, the ingredients must be such as will contribute in whole or in part to the formation of an alloy steel when the composition is subjected to heat. The contact between the heavy metals, carbon and borax is further increased by building up consecutive layers of the fluxing and bonding composition using a suitable hydrophobic colloid such as sodium silicate, as a binder, in cases where a composite rod is used, and is further increased by the drying of finely divided carbon and borax together with the one or more heavy metals constituting the vehicle used, in a solution of sodium silicate, repulverizing the same, and confining it within a tubular container, in cases where a tube is used. Under the conditions of use as set forth, irrespective of whether the fluxing and bonding composition is applied to a rod proper or utilized in a tubular container, the one or more heavy metals, the carbon and borax are afforded an excellent opportunity to react with each other under conditions where they cannot escape and where they are not at all affected by atmospheric conditions at the high temperature employed. As the result of the combination of materials under the conditions specified when the rod or tube is subjected to the flame of an oxyacetylene torch or the like there is formed during the welding operation an alloy steel containing boron carbide and which results in several important properties.

In the form of the invention as shown in Figs. 1 and 2, A designates a composite rod; 1, a core which may be of either a ferrous metal, an alloy, or a fibrous material, but which as shown is a high carbon steel; 2, a coating of a solution of sodium silicate; and 3, a mixture of finely divided carbon and borax suspended in a vehicle consisting of finely divided cast iron, ferro-manganese, and ferrochrome; the resultant mixture being enveloped or coated by a sodium silicate solution.

In the production of this composition and the application of same, resulting in the formation of the rod as above, applicants have successfully used the following method:

First, reducing the carbon, borax, cast iron, ferro-manganese and ferrochrome to a finely divided state of approximately 60 mesh; next bringing these ingredients into intimate association, which is facilitated by virtue of the fact that they are all of substantially the same mesh; then, after having selected a high carbon steel core of suitable diameter and length, applying a coating of a solution of sodium silicate to the same by dipping, painting, or otherwise; then, before the solution is allowed to dry on the core, bringing the core into contact with the finely divided mixture, as above, by rolling or otherwise, but in such manner that the sodium silicate is thereby subjected to sufficient pressure to cause it to penetrate and completely envelope or coat each component particle of the mixture which necessarily results not only in the formation of a coating or layer of the mixture adhering to the core, but in a coating or layer of the mixture which is completely enveloped by the sodium silicate solution, so that the ingredients are effectively sealed or protected against atmospheric conditions; allowing the coating or layer to dry, and again repeating the process, if desired.

In this connection, it will be obvious that in the formation of a coating or layer of the mixture on the core as described, the amount of sodium silicate solution used must be appreciably greater than that of the carbon and borax in order to realize the desired results and also that as many coatings or layers may be applied to the core as found necessary in order to obtain a desired diameter or in order to realize desired ratios between the weight of the core and that of the composition. In actual practice, however, it has been found desirable in most cases to use several coatings or layers.

In making a deposit from this rod to a suitable base metal by the use of, preferably, an oxyacetylene torch, inasmuch as a relatively high temperature must be employed, the carbon and borax, being unable to escape, react with each other, some of the borax being reduced to free boron which combines with the carbon forming boron carbide which in turn dissolves in the steel alloy formed from the steel core, the cast iron, the ferromanganese, and the ferrochrome.

The carbon and borax, together with one or more heavy metals of the vehicle, under the conditions used are primarily responsible for the formation of a tin white product which is very fluid at the temperature employed and forms a bond between the deposited metal and the base metal. This bond is readily discernible with the eye and consists of a tin white deposit which quickly flows on the base metal before little, if any, of the rod is melted.

After cooling, this deposit can clearly be seen as a white line existing between the base metal and the deposited metal. Our research would seem to indicate that this is a ternary alloy of iron, manganese chromium or some other heavy metal, and boron carbide.

The steel is not only employed to provide the major portion of a ferrous base but also reacts with the ferromanganese and ferrochrome, thereby producing a manganese chromium steel alloy, containing boron carbide.

The cast iron is employed not only as a vehicle but also to modify the melting point of the rod by lowering the melting point of the steel, ferromanganese, and ferrochrome. The ferromanganese also contributes to the low melting point of the steel and in addition imparts hardness and toughness to the weld deposit. However, the boron carbide appears to be chiefly responsible for the low melting point.

A rod embodying such composition can be effectively used in making deposits therefrom on a base metal having foreign matter thereon, such as grease, paint, rust or the like, as for example, in cases where the base metal employed has rust deposits thereon, some of the borax escaping reduction and some of the carbon, coming into contact with the rust and destroying it, the carbon reducing it to iron and the borax converting it to iron borate which goes off in the slag. It will be understood that in such cases, it is not necessary, therefore, to resort to the use of some mechanical means such as polishing or grinding for removal of the rust or other foreign matter, which is the common practice today.

It will thus be noted that there is provided a rod of the character and for the purpose as described, employing one or more coatings or layers of our improved fluxing and bonding composition, having a melting point lower than that of the core, which rod has great fluidity during application of a deposit therefrom, and hence is capable of being deposited in a very thin hard skin and also is capable of being applied to a base metal at a temperature below the melting point of high or low carbon steel, cast iron, etc., without either cleaning or fusion or melting of the base metal as it is the common practice to do. This latter property is of particular significance for, since it is not necessary to fuse or melt the base metal to secure a bond between the base metal and the deposit, the minimum physical and structural changes take place in the base or parent metal.

For a better understanding of the invention, reference should be made to Figs. 3 and 4 of the drawings. In Fig. 3 there is shown a representation of a microphotograph of a specimen, wherein a deposit B from a rod embodying the above composition has been made on a rusty base metal of high carbon steel C. This representation is of approximately 400 magnification and distinctly shows the bond line D between the base metal and the deposited metal. It will also be observed that there is no fusion or melting of the base metal in effecting the bond between the deposited metal B and the base metal C.

In Fig. 4 there is shown a representation of a microphotograph of a specimen, wherein a similar deposit E has been made on a rusty base metal F of low carbon steel. This representation is of approximately 400 magnification, and here again it will be observed that the bond between the deposit E and the base metal F is accomplished without fusion or melting of the base metal.

In Fig. 5 of the drawings there is shown an oxyacetylene torch 4, for use in making a deposit from the rod A on a base metal 5. In carrying out this operation, the flame of the torch should first be adjusted to a neutral flame to heat that portion of the base metal where the deposit is to be made, to a bright red heat, approximately 1800 to 2000° F. Then the flame of the torch is adjusted to a carbonizing flame and the rod A held as shown, in close proximity to the flame 6, allowing the rod to melt and drop or drip as at 7, on the heated surface of the base metal 5. By this method a deposit can be built up of any desired thickness. It will be noted that the fluxing and bonding composition employed in the rod melts prior to the melting of the steel core 1, as shown by the tapered lower end 8.

In the form of the invention shown in Fig. 6 and Fig. 7 of the drawings, we have shown the rod in the form of a tubular container G which may be either a ferrous or alloy tube or even be made of fibrous material, but which is shown in the form of a high carbon steel tube 9. The same fluxing and bonding composition is employed as in the case of the composite rod as shown in Figs. 1 and 2. The carbon, borax, cast iron, ferromanganese and ferrochrome in a finely divided state are saturated or mixed with a solution of sodium silicate and then allowed to thoroughly dry, after which the mix is reduced to a fineness of approximately 60 mesh, with a resulting mix 10. One end of the tube 9 is then closed as by crimping, rolling or otherwise, and the mix 10 thus formed then is placed within the tube and the open end of the tube similarly closed.

In Fig. 8 of the drawings there is shown an oxyacetylene torch 11, having a carbonizing flame 12, for use in making a deposit 13 from the tubular container G on a base metal 14. The preferred method as previously described is likewise applicable in the case of a tubular container and further explanation is rendered unnecessary. It will be noted that the fluxing and bonding composition melts prior to the melting of the steel tube 9, as shown by the line 15. It has been found advantageous to melt the closed working end of the tube off before the tube is placed in position to begin the process of making the deposit as at 13 on a base metal, as at 14.

Applicants have successfully used a rod, both in the form of a composite rod and in the form of a tubular container, of substantially the following composition: steel, 24 parts by weight; cast iron, 12 parts by weight; ferromanganese, 5 parts by weight; ferrochrome, 5 parts by weight; borax, 1 part by weight; carbon, 1 part by weight; together with sufficient sodium silicate for the purposes as defined.

It has been found that the variation of the proportions of the ingredients is permissible within certain limits, and applicants have successfully used the following: steel, 15 to 30 parts by weight; cast iron, 8 to 15 parts by weight; ferromanganese, 3 to 8 parts by weight; ferrochrome, 2 to 8 parts by weight; borax, 0.25 to 5 parts by weight; carbon, 0.25 to 3 parts by weight.

Applicants have also used a rod or tube having substantially the following composition: steel, 15 to 30 parts by weight; ferromanganese, 3 to 15 parts by weight; cast iron, 5 to 20 parts by weight; borax, 0.55 to 8 parts by weight; carbon, 0.25 to 5 parts by weight.

We have found that our fluxing and bonding composition can be effectively used to assist the bonding of present day welding rods without cleaning or melting the base metal and for this purpose we preferably use a composition of ferromanganese, 5 to 15 parts by weight; borax, 2 to 8 parts by weight; and carbon, 0.25 to 5 parts by weight. Its application in this connection can be accomplished in several different ways; for example: (a) coating the rod with a solution of sodium silicate, then bringing the rod into contact with the composition outlined, by dipping, rolling or the like; (b) saturating or moistening the composition with a solution of sodium silicate and after drying, reducing same to a fineness of about 60 mesh, then heating the rod and bringing it into contact with the pulverized composition, the pulverized composition adhering to the rod; (c) having a composition suspended in a solution of sodium silicate contained in a bottle or the like and dipping the rod or tube in same.

It will be understood that in any of the above compositions ferronickel, ferrovanadium, cobalt, tungsten, or similar materials may be added where it is desired to modify the properties of the resulting alloy steel but are not essential to obtain the results already explained. Also, in cases where a fibre rod or tube is employed, steel may be added to the composition if desired.

As will be obvious, deviation may be made from the scheme or methods above suggested, and also in the proportions of the ingredients suggested in the practice of the invention, and accordingly it is not desired to limit or restrict the particular disclosure herein contained, except as limited in the appended claims and the prior art.

We claim as our invention:

1. A rod adapted for use in either a welding or brazing operation of substantially the following composition: steel, 24 parts by weight; cast iron, 12 parts by weight; ferromanganese, 5 parts by weight; ferrochrome, 5 parts by weight; borax, 1 part by weight; carbon, 1 part by weight; together with sufficient sodium silicate to coat or envelope the mixture and to serve as a binder.

2. A rod adapted for use in either a welding or brazing operation, of substantially the following composition: steel, 15 to 30 parts by weight; cast iron, 8 to 15 parts by weight; ferromanganese, 3 to 8 parts by weight; ferrochrome, 2 to 8 parts by weight; borax, 0.25 to 5 parts by weight; carbon, 0.25 to 3 parts by weight; together with sufficient sodium silicate to coat or envelope the mixture and to serve as a binder.

3. A rod adapted for use in either a welding or brazing operation comprising steel, 15 to 30 parts by weight; ferromanganese, 3 to 15 parts by weight; cast iron, 5 to 20 parts by weight; borax, 0.5 to 8 parts by weight; carbon, 0.25 to 5 parts by weight; together with sufficient sodium silicate to envelope the carbon, borax, ferromanganese and cast iron and to serve as a binder.

4. A welding rod consisting of a tubular container, and a fluxing and bonding composition within said container, said fluxing and bonding composition comprising ferromanganese 5 to 15 parts by weight; borax 1 to 8 parts by weight; carbon 0.25 to 5 parts by weight.

5. A composite rod for use in a welding operation or the like consisting of a fibrous core and one or more coatings of a mixture comprising cast iron, 12 parts by weight, ferromanganese, 5 parts by weight, borax 1 part by weight, carbon one part by weight, together with water glass to envelope said materials and to serve as a binder.

6. A composite rod for use in a welding operation or the like consisting of a fibrous core and one or more coatings of a mixture of cast iron 8 to 15 parts by weight, ferromanganese, 2 to 8 parts by weight; borax 0.25 to 5 parts by weight, carbon 0.25 to 3 parts by weight, together with sufficient water glass to envelope said materials and to serve as a binder.

7. A composite rod for use in a welding operation or the like consisting of fibrous core and one or more coatings of the mixture of cast iron 8 to 15 parts by weight, ferromanganese 3 to 8 parts by weight, ferrochrome 2 to 8 parts by weight, borax 0.25 to 5 parts by weight, carbon 0.25 to 3 parts by weight, together with sufficient water glass to envelope said materials and to serve as a binder.

8. A rod for use in a welding operation or the like having, as essential ingredients thereof, a mixture of carbon and borax coated or enveloped by a sodium silicate solution, the coat of sodium silicate being greater by weight than the carbon and borax and the latter in sufficient amounts for formation in situ of boron carbide during the welding operation.

9. A rod for use in a welding operation or the like having, as essential ingredients thereof, from ½ to 1 part of carbon to 1 part of borax, the carbon and borax being protected by one or more sodium silicate coatings.

10. A rod for use in a welding operation or the like having, as essential ingredients thereof, from ½ to 1 part of carbon, 1 part of borax and from 3 to 10 parts of sodium silicate solution.

11. A composite rod for use in a welding operation or the like, which comprises a high carbon steel core and a series of coatings comprising a mixture of finely divided carbon, borax, cast iron, ferro manganese, and ferrochrome, together with sufficient sodium silicate to coat or envelop said mixture, and to serve as a binder therefor, the ratio by weight of the total coatings to the weight of the core being 1 part of core to ½ to 1½ parts of coatings.

12. A welding rod consisting of a tubular container and a fluxing and bonding composition within said container, said fluxing and bonding composition comprising 0.25 to 1.5 parts of finely divided carbon, one part of borax, and 3 to 5 parts of sodium silicate.

13. A welding rod consisting of a tubular container and a fluxing and bonding composition comprising 0.25 to 1.5 parts of finely divided carbon, one part of borax and 3 to 5 parts of sodium silicate together with one or more vehicles selected from the group comprising cast iron, ferromanganese, ferrochrome, cobalt, and tungsten.

14. A rod for use in a welding or brazing operation or the like consisting of a tubular container of steel and a fluxing and bonding composition within said container, said fluxing and bonding composition comprising a mixture of finely divided carbon, borax, and sodium silicate together with one or more vehicles selected from the group comprising cast iron, ferromanganese, ferrochrome, cobalt and tungsten, the borax and carbon reacting under application of heat to produce boron carbide which coacts with a portion of the alloy steel to form a tin white bond line adjacent the base metal without fusion of the latter.

15. A composite rod for use in a welding operation or the like, which comprises a steel core and a series of coatings comprising a mixture of finely divided carbon, borax and sodium silicate together with one or more vehicles, selected from the group comprising cast iron, ferromanganese, ferrochrome, cobalt and tungsten, the borax and carbon reacting under application of heat to produce boron carbide which coacts with a portion of the alloy steel to form a tin white bond line adjacent the base metal without fusion of the latter.

16. In a welding rod in combination, an extended rigid member, component fluxing and bonding material comprising essentially cast iron about 12 parts, ferromanganese about 5 parts, ferrochrome about 5 parts, carbon ½ to 1 part, borax about 1 part, sodium silicate 3 to 10 parts, said material being uniformly distributed along said member and retained thereby to form a welding rod.

17. A rod adapted for use in either welding or brazing operation comprising cast iron 5 to 20 parts, ferromanganese 3 to 15 parts, borax 0.5 to 8 parts, carbon 0.25 to 5 parts and sodium silicate 3 to 10 parts.

18. A welding rod including a steel core, a coating thereon comprising 3 to 15 parts of ferromanganese, .25 to 8 parts of borax, .25 to 5 parts of carbon, and sufficient sodium silicate to form a binder, wherein, during application of welding heat, the carbon will reduce to iron any rust on the welded surface, the iron reacting with the borax to convert it into iron borate as a slag product.

CLEBURNE A. BASORE.
DANIEL T. JONES.